Aug. 8, 1950   J. N. PAQUIN   2,517,705
TUBE COUPLING
Filed Aug. 6, 1945

INVENTOR.
JOSEPH N. PAQUIN
BY Richey + Watts
ATTORNEYS

Patented Aug. 8, 1950

2,517,705

UNITED STATES PATENT OFFICE 2,517,705

TUBE COUPLING

Joseph Norman Paquin, Euclid, Ohio, assignor to The Weatherhead Company, Cleveland, Ohio, a corporation of Ohio Application August 6, 1945, Serial No. 609,080

2 Claims. (Cl. 285—166)

My invention relates to tube couplings and fittings.

In certain types of tube fittings, using a ring or a ferrule that cuts into the tube and forms its own seat, it is a difficult and time-consuming operation to prepare the ring or ferrule so that it will have a sharp edge to shear into the tube.

It is an object of my invention to provide an improved method for making a tube joint or coupling by means of a simple sleeve or ring without special preparation of the sleeve.

It is an object of my invention to provide an improved fitting and tube coupling which is simple and inexpensive to manufacture and in which it is easy to insert the tube in the fitting.

A further object is to avoid the necessity for special preparations and to avoid the need for flaring or threading the tube.

A further object is to make a pressure-tight joint in unthreaded tubing.

A further object is to provide for holding a joining sleeve or ring when the joint is being made and to prevent spreading or splaying at the back end of the sleeve.

A further object is to avoid the imposition of radial compression at the back end of the sleeve, and to leave all the compressive effect for the front end of the sleeve to increase effectiveness in gouging into the tube.

Other and further objects, features and advantages of the invention will become apparent as the description proceeds.

In carrying out my invention in its preferred form, I provide a fitting comprising a threaded nut, a sleeve or a ring and a body to receive the tube to which the body is to be joined. A shallow recess is provided in the nut to receive the ring and hold it squarely in the body so that the tube can be inserted in the body without removing the nut or the ring from the body. The body of the fitting is machined with threads to mate the nut and it has a taper for forcing the ring to cut into the tube when the nut is tightened against the ring into the body.

A better understanding of the invention will be afforded by the following detailed description considered in conjunction with the accompanying drawing in which.

The invention relates to improvements in tube and pipe joints of the type described in Patent 2,139,413—Kreidel, dated December 6, 1938.

Figure 2:
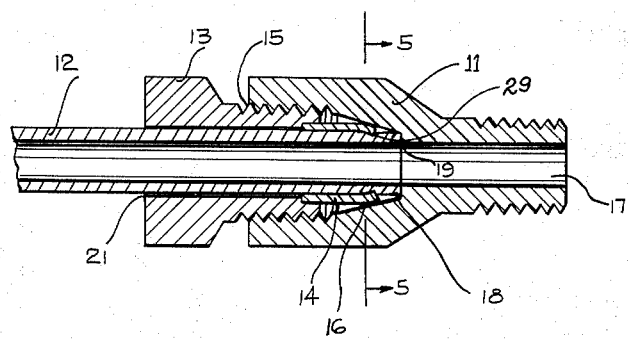
Fig. 2 is a longitudinal medial sectional view of a tube coupling in accordance with my invention showing the manner of making a joint with a smooth tube.
Figures 3, 4:
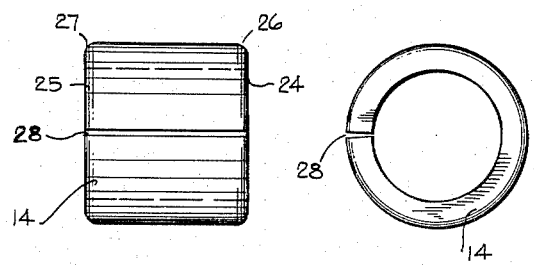
Fig. 3 is an elevation of a ring or sleeve, for use in the coupling illustrated in Fig. 2.
Fig. 4 is an end view of the ring shown in Fig. 3.

An example of an improved coupling embodying my invention is illustrated in Fig. 2 of my drawing. The coupling comprises a body 11 adapted to receive a smooth unthreaded tube 12, with which a joint is to be made, a nut 13 adapted to be threaded into the body 11 and a ring or sleeve 14 for making a joint between the tube 12 and the body 11. The tube 12 is originally uniform in diameter and undented.

The body 11 is threaded at 15 to receive the nut 13 and has a tapered recess 16 communicating with a bore 17 adapted to form a continuation of the passage through the tube 12. The minimum diameter portion 18 of the recess 16 is just large enough to receive the end of the tube 12; and the diameter of the bore 17 is sufficiently less to form a shoulder 19 against which the end of the tube 12 is adapted to fit.

The nut 13 has a bore 21 of sufficient diameter to make a loose fit around the tube 12, and the inner end of the bore 21 is counter-bored to form a portion 22 of greater diameter and a shoulder 23. The counter-bore 22 is of sufficient diameter to receive and hold the ring or sleeve 14.

The taper of the recess 16 in the body 11 is sufficient for compressing the ring 14, for example, from 10 to 15 degrees.

The ring 14 has sharp inner edges 24 and 25 at both the front and back ends respectively. The outer edges 26 and 27 are rounded with a radius preferably approximately three-fourths of the thickness of the wall of the ring 14. The ring 14 is composed of suitable material, preferably low-carbon steel and is preferably formed from flat strip material. It may be sheared from a strip with sheared edges brought together to form a joint 28, but the sheared edges are preferably not united. The original inner diameter of the ring 14 before it has been compressed in the body 11 to make a joint with the tube 12 is just enough greater than the outer diameter of the tube 12 to make a slip-fit. Preferably the ring 14 has a slight tendency to spring open before it has been placed in the counterbore 22. This tendency serves to retain the ring 14 in the counterbore 22 of the tube nut 13 so that the two parts can be stocked as one assembly.

When a joint is to be made between the body 11 and the tube 12, the parts of the coupling may first be assembled with the ring 14 held within the counterbore 22 of the nut 13 and the nut 13 partially threaded into the body 11. The end of the tube 12 is then slipped through the bore 21 in the nut 13 and through the sleeve or ring 14 against the shoulder 19 in the body 11.

While the tube 12 is held in position against the shoulder 19, the nut 13 is tightened by threading it into the body 11.

The back end of the ring 14 seats against the shoulder 23 in the tube nut 13 and axial application of pressure is made through these abutting surfaces. This forces the rounded edge 26 of the sleeve against the gradually reducing diameter tapered surface of the recess 16 in the body 11. The axial movement of the cutting ring 14 causes a diametrical reduction of the ring at the point where it engages the taper 16. This gradual reduction accompanied by a forward movement causes the sharp edge 24 to cut into the outer surface of the tube 12 and push the displaced metal forward, thus forming a shoulder or seat 29 without appreciably reducing tube diameter. The originally sharp edge 24 of the ring 14 may be dulled in the process, but a pressure tight joint is formed at the annular groove 29 in the tube 12. Furthermore, the tube 12 is held in the body 11 against the shoulder 19 so that fluid pressure or pull on the tube 12 away from the body 11 cannot pull the end of the tube loose away from the body 11.

Figure 1:
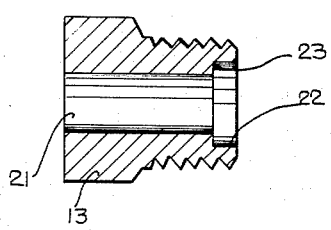
Fig. 1 is a longitudinal medial section of a nut which forms an embodiment of my invention for use in a tube coupling.
Figure 5:
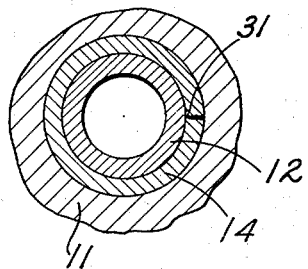
Fig. 5 is a cross-sectional view of the tube and ring shown in Fig. 2 represented as cut by a plane 5—5.

Since the ring 14 is made from flat stock butted together, the inner edges will butt together before the outer edges meet due to the slight difference in circumference between the inner and outer surfaces of the ring. The ring 14 need be contracted radially only a sufficient amount to cause the joint 28 to be butted together at the outside diameter of the ring to accomplish a seal. Since the ring is already very nearly closed at the inside diameter before any tightening takes place, no fin occurs at the cutting edge. However, a fin 31 (see Fig. 5) starts immediately back of the cutting edge and may extend for approximately one-sixteenth of an inch, depending upon the total axial movement of the sleeve 14 when it is being tightened into sealing engagement with the tube 12. The fin or extrusion of metal 31 is tightly held in the joint 28 and serves the useful function of preventing the ring 14 from rotating on the tube 12 upon disassembly of the joint and subsequent retightening.

Since the ring or sleeve 14 is retained within the nut 14, the back end of the sleeve 14 cannot spread or splay. The ring 14 is held square and all of the compressive effect is concentrated at the front end of the sleeve where it cuts into the tube 12.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What is claimed is:

1. A tube coupling comprising a body member having a tapered bore with a shoulder at the smaller end of said taper, said shoulder being adapted to engage the end of a tube disposed in said tapered bore, a clamping member having a bore for receiving the tube, a counterbore in the end of said clamping member facing said body member, means to draw said members together, and a generally cylindrical split cutting ring having a tube cutting edge formed at its forward end, the rearward portion of said split ring fitting in the counterbore of said clamping member, said ring portion in its unstressed condition being of larger diameter than the diameter of the counterbore so that the ring presses radially outwardly against the wall of the counterbore when seated therein, the forward end of said ring being disposed within said tapered bore so that as said members are drawn together the forward end of said ring is compressed with the cutting edge cutting into the tube, the wall of the counterbore in said clamping member preventing expansion of the rearward ring portion.

2. A tube coupling comprising a body member having a tapered bore with a shoulder at the smaller end of said taper, said shoulder being adapted to engage the end of a tube disposed in said tapered bore, a clamping member having a bore for receiving the tube, a counterbore in the end of said clamping member facing said body member, means to draw said members together, and a generally cylindrical split cutting ring having a tube gripping portion formed at its forward end, the rearward portion of said split ring fitting in the counterbore of said clamping member, said ring portion in its unstressed condition being of larger diameter than the diameter of the counterbore so that the ring presses radially outwardly against the wall of the counterbore when seated therein, the forward end of said ring being disposed within said tapered bore so that as said members are drawn together the forward end of said ring is compressed to bring the split edges tightly together with the forward end of the ring gripping the tube, the wall of the counterbore in said clamping member preventing expansion of the rearward ring portion.

JOSEPH NORMAN PAQUIN.

REFERENCES CITED

The following references are of record in the file of this patent:

UNITED STATES PATENTS

| Number | Name | Date |
| --- | --- | --- |
| 1,927,451 | Dobrick | Sept. 19, 1933 |
| 2,150,042 | Shultz | Mar. 7, 1939 |
| 2,182,811 | Kocher | Dec. 12, 1939 |
| 2,344,032 | Eden | Mar. 14, 1944 |
| 2,414,184 | Wurzburger | Jan. 14, 1947 |